United States Patent
Liu et al.

(10) Patent No.: US 10,971,757 B2
(45) Date of Patent: Apr. 6, 2021

(54) LITHIUM-ION BATTERY AND ITS ELECTROLYTE

(71) Applicant: Contemporary Amperex Technology Co., Limited, Ningde (CN)

(72) Inventors: Jiqiong Liu, Ningde (CN); Changlong Han, Ningde (CN); Xiaomei Wang, Ningde (CN); Jianwei Zhu, Ningde (CN); Yan Zhou, Ningde (CN); Feng Huan, Ningde (CN); Kun Yu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 217 days.

(21) Appl. No.: 15/572,593

(22) PCT Filed: Aug. 24, 2017

(86) PCT No.: PCT/CN2017/098806
§ 371 (c)(1),
(2) Date: Jul. 20, 2018

(87) PCT Pub. No.: WO2018/214312
PCT Pub. Date: Nov. 29, 2018

(65) Prior Publication Data
US 2020/0014065 A1 Jan. 9, 2020

(30) Foreign Application Priority Data
May 26, 2017 (CN) .......................... 201710384985.6

(51) Int. Cl.
| | |
|---|---|
| H01M 10/0567 | (2010.01) |
| H01M 10/0525 | (2010.01) |
| H01M 4/36 | (2006.01) |
| H01M 4/38 | (2006.01) |
| H01M 4/587 | (2010.01) |

(52) U.S. Cl.
CPC ....... H01M 10/0567 (2013.01); H01M 4/364 (2013.01); H01M 4/386 (2013.01); H01M 4/587 (2013.01); H01M 10/0525 (2013.01); H01M 2300/0025 (2013.01)

(58) Field of Classification Search
CPC ......... H01M 10/0567; H01M 10/0525; H01M 4/36; H01M 4/38; H01M 4/587
See application file for complete search history.

(56) References Cited

U.S. PATENT DOCUMENTS

| | | | | |
|---|---|---|---|---|
| 2012/0258357 A1* | 10/2012 | Kim | ...................... | H01M 6/166 429/199 |
| 2013/0069601 A1* | 3/2013 | Coowar | ............ | H01M 10/0568 320/162 |
| 2014/0087250 A1* | 3/2014 | Coowar | ................ | H01M 4/134 429/211 |
| 2017/0117586 A1* | 4/2017 | Dubois | ................. | H01M 4/485 |

FOREIGN PATENT DOCUMENTS

| | | |
|---|---|---|
| CN | 101587971 A | 11/2009 |
| CN | 102696142 A | 9/2012 |
| CN | 103208653 A | 7/2013 |
| CN | 103682443 A | 3/2014 |
| CN | 104466250 A | 3/2015 |
| CN | 104981934 A | 10/2015 |
| CN | 105098236 A | 11/2015 |
| CN | 105355975 A | 2/2016 |
| CN | 105745780 A | 7/2016 |
| CN | 106058316 A | 10/2016 |
| CN | 106133986 A | 11/2016 |

(Continued)

OTHER PUBLICATIONS

Machine Translation of: CN 106058316, Hu et al., Oct. 26, 2016.*
The First Office Action and search report dated Aug. 20, 2019 for Chinese Application No. 201710384985.6, 7 pages.
PCT International Search Report for PCT/CN2017/098806, dated Jan. 31, 2018, 11 pages.
The extended European search report dated Aug. 23, 2018 for European application No. 17791916.4, 8 pages.

(Continued)

*Primary Examiner* — Kenneth J Douyette
(74) *Attorney, Agent, or Firm* — Law Offices of Liaoteng Wang

(57) ABSTRACT

The present invention discloses a Lithium ion battery and an electrolyte thereof, the electrolyte comprising an organic solvent, a lithium salt and an additive. The additive comprises a cyclic fluoro carbonate (A), a cyclic phosphazene (B), a cyclic sulfate and a lithium fluoro oxalate borate (D). The lithium fluoro oxalate borate (D) has following formula:

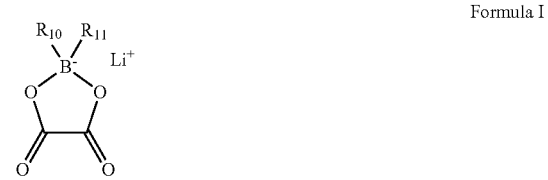

Formula I

Compared with the prior art, the electrolyte of the present invention may form a stable CEI and SEI film on the surface of positive and negative electrodes, protect the interface between positive and negative electrodes, improve the acidic atmosphere of Lithium ion battery electrolyte, and reduce the damage effect of HF on the interface between positive and negative electrodes, while reducing low temperature resistance of lithium-ion battery, improving cycle life, high temperature storage performance, safety performance and rate capability of lithium-ion battery.

11 Claims, No Drawings

(56) References Cited

FOREIGN PATENT DOCUMENTS

| | | |
|---|---|---|
| CN | 106532117 A | 3/2017 |
| CN | 106537664 A | 3/2017 |
| WO | 2015179210 A1 | 11/2015 |

OTHER PUBLICATIONS

Choi et. al, "Effect of fluoroethylene carbonate additive on interfacial properties of silicon thin-film electrode", Journal of Power Sources 161 (2006), pp. 1254-1259.

Xu Jie et. al, "Effect of Fluoroethylene Carbonate Additive on the Performance of Lithium Ion Battery", Acta Phys.—Chim. Sin., 2009, 25(2), pp. 201-206.

* cited by examiner

LITHIUM-ION BATTERY AND ITS ELECTROLYTE

CROSS-REFERENCE TO RELATED APPLICATION

This application is based on and claims priority to Chinese Patent Application No. 201710384985.6 filed on May 26, 2017, which is incorporated herein by reference in its entirety.

TECHNICAL FIELD

The present invention relates to the field of Lithium ion batteries, and more particularly, to a Lithium ion battery and an electrolyte thereof.

BACKGROUND

Lithium-ion secondary batteries are widely used in electric vehicles and consumer electronics because of their high energy density, high output power, long cycle life and low environmental pollution. Electrolyte as an ion transport "highway" plays a very important role in the lithium-ion battery.

With the increased energy density requirement of Lithium ion batteries, a new generation of Lithium ion battery with a positive electrode of Ni, Co and Mn and a negative electrode of high energy density graphite and Si has become current research hotspot. However, because volume expansion of Si is much larger than volume expansion of the traditional graphite, expansion and contraction of SiC negative electrode during cycle will cause SEI film to break, thereby resulting in the film-forming additive or solvent to be consumed continuously and even to be exhausted and eventually leading to battery diving.

In the prior art, the usual way is to add a large amount of film-forming additives so that the film is regenerated after each cycle. This way allows the battery to be maintained for a period of time without diving. However, in the redox process for the film formation, a large amount of acid gas is generated and the resulting acid gas corrodes the positive and negative passivation films, or even destroy the positive active material which bring about a serious threat to the battery safety.

Moreover, a large amount of added film-forming additives inevitably lead to increased interface impedance, resulting in decrease in the rate capability of the Lithium ion battery. One of the difficulties of the current study is how to improve the cycle life and storage life of lithium-ion battery at the same time without reducing the rate capability of lithium-ion battery.

In view of this, it is necessary to provide a Lithium ion battery and its electrolyte with excellent performance which Lithium ion battery exhibits reduced low temperature internal resistance and improved cycle life, high temperature storage performance and safety performance.

SUMMARY

An object of the present invention is to overcome the shortcomings of the prior art and to provide a Lithium ion battery and an electrolyte thereof having excellent properties which Lithium ion battery exhibits reduced low temperature internal resistance and improved cycle life, high temperature storage performance and safety performance.

In order to achieve the above object, the present invention provides a Lithium ion battery electrolyte comprising an organic solvent, a lithium salt, and an additive, wherein the additive comprises a cyclic fluoro carbonate (A), a cyclic phosphazene (B), a cyclic sulfate (C) and a lithium fluoro oxalate borate (D), the lithium fluoro oxalate borate having a structural formula:

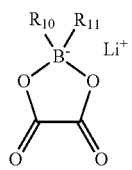

Formula I wherein $R_{10}$ and $R_{11}$ are each independently selected from one of H, a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, a haloalkyl group having 1 to 20 carbon atoms, a haloalkenyl group having 2 to 20 carbon atoms, a haloalkynyl group having 2 to 20 carbon atoms, a haloaryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 1 to 20 carbon atoms, a haloalkoxy group having 2 to 20 carbon atoms, a haloalkenyloxy group having 2 to 20 carbon atoms, a haloalkynyloxy group having 2 to 20 carbon atoms, a haloaryloxyl group having 6 to 20 carbon atoms and at least one of $R_{10}$ and $R_{11}$ contains a fluorine atom.

The inventors of the present application have made intensive studies to find that a cyclic fluoro carbonate, a cyclic phosphazene, a cyclic sulfate and a lithium fluoro oxalate borate may act at the electrode interface of Lithium ion batteries synergistically and form a stable CEI film and SEI film on the positive and negative electrode so as to protect the positive and negative electrodes interface, while improving the acidic atmosphere of the lithium-ion battery electrolyte, reducing the damage effect of HF on the positive and negative electrodes interface, and significantly reducing low temperature internal resistance of the lithium-ion battery, thereby improving the cycle life, high temperature storage performance, safety performance and rate capability of lithium-ion battery, especially for silicon-containing lithium-ion battery.

In the above general formula I, the specific kind of the alkyl groups in the alkyl group having 1 to 20 carbon atoms are not particularly limited and may be selected depending on the actual requirements. For example, the chain alkyl group and the cycloalkyl group may be selected wherein the chain alkyl group further comprises a linear alkyl group and a branched alkyl group, and the cycloalkyl group may or may not contain a substituent on its ring.

Specific examples of the alkyl group may be given, such as methyl, ethyl, n-propyl, isopropyl, cyclopropyl, n-butyl, isobutyl, sec-butyl, t-butyl, n-pentyl, iso-pentyl, neopentyl, cyclopentyl, n-hexyl, isohexyl, cyclohexyl, heptyl, cycloheptyl, octyl, cyclooctyl, nonyl, decyl, undecyl, dodecyl, tridecyl, tetradecyl, pentadecyl, hexadecyl, heptadecyl, octadecyl, nonadecyl, eicosyl and the like.

In the general formula I, the number of the halogen atom and the substitution position thereof in the haloalkyl group having 1 to 20 carbon atoms with a halogen atom of F, Cl, Br, and I are not particularly limited. According to actual demand, a halogen atom may be selected to replace some of the hydrogen atoms or all of the hydrogen atoms in the alkyl group. For example, the number of halogen atoms may be one, two, three, four or more. When the number of halogen atoms is two or more, the halogen atoms may be the same or different.

Specific examples of the haloalkyl group may be given, such as chloromethyl, 1-chloroethyl, 2-chloroethyl, 2-chloroisobutyl, 1,2-dichloroethyl, 1,3-dichloroisopropyl, 1,3-dichlorobutyl, 1,2,3-trichloropropyl, bromomethyl, 1-bromoethyl, 2-bromoethyl, 2-bromoisobutyl, 1,2-dibromoethyl, 1,3-dibromoisopropyl, 1,3-dibromo-tert-butyl, 1,2,3-tribromopropyl, iodomethyl, 1-iodoethyl, 2-iodoethyl, 2-iodoisobutyl, 1,2-diiodoethyl, 1,3-diiodoisopropyl, 1,3-diiodo-tert-butyl, 1,2,3-triiodopropyl, fluoromethyl, 2-fluoroisobutyl, 2-fluoroethyl, 1-fluoroethyl, 3-fluoro-n-propyl, 2-fluoro-isopropyl, 4-fluoro-n-butyl, 3-fluoro-sec-butyl, 2-fluoro-sec-butyl, 5-fluoro-n-pentyl, 1-fluoro-n-pentyl, 4-fluoroisopentyl, 3-fluoroisopentyl, 6-fluoro-n-hexyl, 4-fluoro-iso-hexyl, 7-fluoro-n-heptyl, 8-fluoro-n-octyl, 1,2-difluoroethyl, difluoromethyl, trifluoromethyl, pentafluoroethyl, perfluoroisopropyl, perfluorobutyl, perfluorocyclohexyl and the like.

In the above-mentioned general formula I, the kind and number of the alkenyl groups in the alkenyl group having 2 to 20 carbon atoms are not particularly limited and may be selected depending on the actual requirements such as the chain alkenyl group and the cycloalkenyl group, wherein the chain alkenyl group further comprises a straight alkenyl group and a branched alkenyl group and the cycloalkenyl group may or may not contain, for example, a substituent for example an alkyl group on its ring. In particular, the number of double bonds may be one, two, three or four.

Specific examples of the alkenyl group may be given such as vinyl, allyl, 1-butenyl, 2-butenyl, 3-butenyl, 1,3-butadienyl, 1-pentenyl, 2-pentenyl, 3-pentenyl, 1-hexenyl, 2-hexenyl, 3-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-methylvinyl, styryl, 2,2-diphenylvinyl, 1,2-diphenylvinyl, 1-methylallyl, 1,1-dimethyl allyl, 2-methylallyl, 1-phenylallyl, 2-phenylallyl, 3-phenylallyl, 3,3-diphenylallyl, 1,2-dimethylallyl, 1-phenyl-1-butenyl, 3-phenyl-1-butenyl, cyclopentenyl, cyclohexenyl, cycloheptenyl and the like.

In the general formula I, the number of the halogen atom and the substitution position thereof in the haloalkenyl group having 2 to 20 carbon atoms with a halogen atom of F, Cl, Br, and I are not particularly limited. According to actual demand, the halogen atom may be selected to replace some of the hydrogen atoms or all of the hydrogen atoms in the alkenyl group. For example, the number of halogen atoms may be one, two, three, four or more. When the number of halogen atoms is two or more, the halogen atoms may be the same or different.

Specific examples of the haloalkenyl group may be given such as 1-fluorovinyl, 1-fluoroallyl, 2-fluoroallyl, 3-fluoroallyl, 2-fluoroisopropenyl, 1-fluoro butenyl, 2-fluoro-1-butenyl, 3-fluoro-1-butenyl, 4-fluoro-1-butenyl, 4-fluoro-2-butenyl, 3-fluoro-2-methylpropenyl, 1-fluoro-2-methylpropenyl, 2-fluoro-1-methylpropenyl, 3-fluoro-1-methylpropenyl, 3-fluoro-2-methylpropenyl, 4-fluoro-3,3-dimethyl-1-butenyl, 6-fluoro-5-hexenyl, 6-fluoro-4-hexenyl, 6-fluoro-2-hexenyl, 6-fluoro-3-hexenyl, 6-fluoro-1-hexenyl, 5-fluoro-2-butenyl, 2-fluoro-2-butenyl, 1-fluoro-2-butenyl, 5-fluoro-2-pentenyl, 5-fluoro-3-pentenyl, 7-fluoro-1-heptenyl, 7-fluoro-2-heptenyl, 7-fluoro-3-heptenyl, 7-fluoro-4-heptenyl, 7-fluoro-5-heptenyl, 7-fluoro-6-heptenyl, 8-fluoro-1-octenyl, 8-fluoro-2-octenyl, 8-fluoro-3-octenyl, 8-fluoro-4-octenyl, 8-fluoro-5-octenyl, 8-fluoro-6-octenyl, 8-fluoro-7-octenyl and the like, wherein F can be replaced by Cl, Br and/or I.

In the general formula I, the specific kind and number of aryl groups in the aryl group having 6 to 20 carbon atoms are not particularly limited and may be selected depending on actual requirements such as phenyl group, phenylalkyl group, an aryl group containing at least one phenyl group, such as a biphenyl group, a fused ring aromatic hydrocarbon group, wherein other substituents such as an alkyl group may be attached to the biphenyl group and the fused ring aromatic hydrocarbon group.

Specific examples of the aryl group may be given such as phenyl, benzyl, 1-naphthyl, 2-naphthyl, 1-anthryl, 1-phenanthryl, o-methylphenyl, m-methylphenyl, p-methylphenyl, p-ethylphenyl, m-ethylphenyl, o-ethylphenyl, 2-methyl-1-naphthyl, 3-methyl-1-naphthyl, 4-methyl-1-naphthyl, 5-methyl-1-naphthyl, 6-methyl-1-naphthyl, 7-methyl-1-naphthyl, 8-methyl-naphthyl, 1-methyl-2-naphthyl, 3-methyl-2-naphthyl, 4-methyl-2-naphthyl, 5-methyl-2-naphthyl, 6-methyl-2-naphthyl, 7-methyl-2-naphthyl, 8-methyl-2-naphthyl, 3-fluorenyl, 9-fluorenyl, 1-tetrahydronaphthyl, 2-tetrahydronaphthyl, 1-acenaphthyl, 1-indanyl, 2-indanyl, 4-vinylphenyl, 3-isopropylphenyl, 4-isopropylphenyl, 4-butylphenyl, 4-isobutylphenyl, 4-n-amylphenyl, 4-isoamylphenyl, 4-tert-butylphenyl, 4-tert-butylphenyl, 4-hexylphenyl, 4-cyclohexylphenyl, 4-octylphenyl, 4-(2-ethylhexyl)phenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2, 5-di-tert-butylphenyl, 2,6-di-tert-butylphenyl, 2,4-di-tert-amylphenyl, 2,5-di-tert-amylphenyl, cyclohexylphenyl, biphenyl, 2, 4, 5-trimethylphenyl, 2,4,6-trimethylphenyl and the like.

In the general formula I, the number of the halogen atom and the substitution position thereof in the haloaryl group having 6 to 20 carbon atoms with a halogen atom of F, Cl, Br, and I are not particularly limited. The number of halogen atoms may be one, two, three, four, five or more. When the number of halogen atoms is two or more, the halogen atoms may be the same or different.

Specific examples of the haloaryl group may be given such as 2-fluorophenyl, 3-fluorophenyl, 4-fluorophenyl, 2-fluoro-4-methylphenyl, 3-fluoro-4-methyl phenyl, 4-fluoro-2-methylphenyl, 2,4-difluorophenyl, 3,4-difluorophenyl, 2,6-difluoro-4-methylphenyl, 2,6-difluoro-3-methylphenyl, 2-fluoro-1-naphthyl, 4-fluoro-1-naphthyl, 2,4,6-trifluorophenyl, 2,3,4,6-tetrafluorophenyl, 4-trifluoromethylphenyl, 2,3,4,5-tetrafluorophenyl, pentafluorophenyl, 3,5-bis(trifluoromethyl)phenyl, trifluoroanthryl, perfluoroanthryl, perfluorobiphenyl and the like. In the examples enumerated above, the fluorine therein may be replaced by Cl, Br and/or I.

In the general formula I, the position and number of oxygen atoms added to the aryloxy group having 6 to 20 carbon atoms are not particularly limited and may be selected depending on the actual requirements. The number of oxygen atoms may be one, two, three or four.

Specific examples of the aryloxy group may be given such as phenoxy, benzyloxy, 2-methylphenoxy, 3-methylphenoxy, 4-methylphenoxy, 2,3-dimethylphenoxy, 2, 4-dimethylphenoxy, 2, 5-dimethylphenoxy, 2,6-dimethylphenoxy, 3,4-dimethylphenoxy, 3,5-dimethylphenoxy, 2,3,4-trimethylphenoxy, 2,3,5-trimethylphenoxy, 2,3,6-trimethylphenoxy, 2,4,5-trimethylphenoxy, 2,4,6-trimethylphenoxy, 3,4, 5-trimethylphenoxy, 2,3,4,5-tetramethylphenoxy, 2,3,4,6-tetramethylphenoxy, 2,3,5,6-tetramethylphenoxy, pentamethylphenoxy, 4-ethylphenoxy, 4-n-propylphenoxy, 4-isopropylphenoxy, 4-n-butylphenoxy, 4-sec-butylphenoxy, 4-tert-butylphenoxy, 4-n-hexylphenoxy 4-n-octylphenoxy, 4-n-decylphenoxy, 4-n-tetradecylphenoxy, 1-naphthyloxy, 2-naphthyloxy, 1-anthryloxy, 1-phenanthryloxy, 9-fluorenyloxy, 1-tetrahydronaphthyloxy, 2-tetrahydronaphthyloxy, 1-acenaphthyloxy, 1-indanyloxy, 2-indanyloxy and the like.

In the general formula I, the number of halogen atoms in the haloaryloxy group having 6 to 20 carbon atoms with a halogen atom of F, Cl, Br, and I may be one, two, three, four, five or more. When the number of halogen atoms is two or more, the halogen atoms may be the same or different.

Specific examples of the haloaryloxy group may be given such as 4-fluorophenoxy, 3-fluorophenoxy, 2-fluorophenoxy, 2,3-difluorophenoxy, 2,4-difluorophenoxy, 2,5-difluorophenoxy, 2,6-difluorophenoxy, 3,4-difluorophenoxy, 3,5-difluorophenoxy, 2,3,4-trifluorophenoxy, 2,3,5-trifluorophenoxy, 2,3,6-trifluorophenoxy, 2,4,5-trifluorophenoxy, 2,4,6-trifluorophenoxy, 2,3,4,5-tetrafluorophenoxy, 2,3,4,6-tetrafluorophenoxy, pentafluorophenoxy, 4-fluoromethylphenoxy, 3-fluoromethylphenoxy, 3-(trifluoromethyl)phenoxy, 4-(trifluoromethyl)phenoxy, 2-fluoromethylphenoxy, 4-(1-fluoroethyl)phenoxy, 3-(2-fluoroethyl)phenoxy, 2-(1-fluoroethyl)phenoxy, 3,5-difluoromethylphenoxy, 3,5-difluoroethylphenoxy, 4-fluorobenzyloxy, 3-fluorobenzyloxy, 2-fluorobenzyloxy, 2-fluoro-1-naphthyloxy and the like. In the examples enumerated above, the fluorine therein may be replaced by Cl, Br and/or I.

In the above general formula I, when an oxygen atom is added to an alkyl group having 1 to 20 carbon atoms to form a group, the position and number of the oxygen atom added are not particularly limited and may be selected according to actual demands to form an alkoxy group or an ether group. The number of oxygen atoms may be one, two, three or four.

Specific examples of the alkoxy group may be given such as methoxy, ethoxy, n-propoxy, isopropoxy, n-butoxy, sec-butoxy, t-butoxy, n-pentyloxy, isopentyloxy, cyclopentyloxy, n-hexyloxy, cyclohexyloxy, isohexyloxy, heptyloxy, octyloxy, 2-ethylhexyloxy, 3-methyl-2-pentyloxy, 5-methyl-3-hexyloxy, 2-ethyl-1-cyclohexyloxy, nonyloxy, decyloxy, 3,7-dimethyloctyloxy,

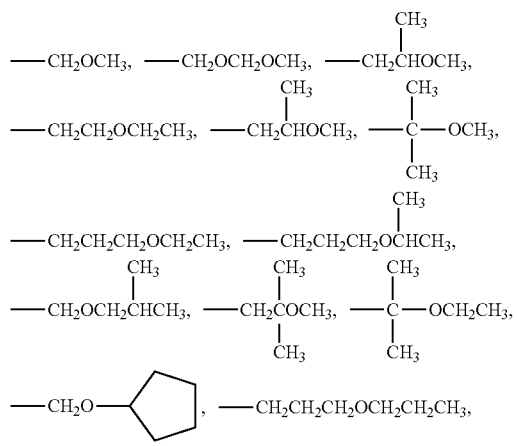

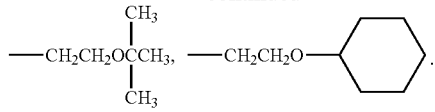

In the general formula I, the kind of the alkoxy group to which the halo group is attached in the haloalkoxy group having 1 to 20 carbon atoms with a halogen atom of F, Cl, Br, I is not specifically limited depending on the actual requirements and may be for example, chain alkoxy and cyclic alkoxy groups. The chain alkoxy groups may include linear alkoxy and branched alkoxy groups. The number of the oxygen atoms in the alkoxy groups is preferably one or two. The cyclic alkoxy group may be substituted or unsubstituted. In addition, the number of halogen groups attached to the alkoxy group may be one, two, three or four.

Examples of the haloalkoxy group may be given such as fluoromethoxy group, 2-fluoroethoxy group, 3-fluoro-n-propyloxy group, 2-fluoroisopropyloxy, 4-fluoro-n-butyloxy, 3-fluoro-sec-butyloxy, 5-fluoro-n-pentyloxy, 4-fluoro-isopentyloxy, 3-fluoro-t-pentyloxy, 3-fluoro-2,2-dimethylpropoxy, 3-fluoro-1-ethylpropoxy, 4-fluoro-1-methylbutoxy, 6-fluoro-n-hexyloxy, 5-fluoro-iso-hexyloxy, 3-fluoro-1,1,2-trimethylpropyloxy, 7-fluoro-n-heptyloxy, 8-fluoro-n-octyloxy, 2-fluorocyclopropyloxy, 2,3-difluorocyclopropyloxy, 2-fluorocyclobutyloxy, 2-fluorocyclopentyloxy, 2-fluorocyclohexyloxy, 4-fluorocyclohexyloxy, 2-fluorocycloheptyloxy, 2-fluorocyclooctyloxy and the like. In the examples enumerated above, the fluorine therein may be replaced by Cl, Br and/or I.

In the above-mentioned general formula I, the kind and number of alkynyl groups in the alkynyl group having 2 to 20 carbon atoms are not particularly limited and may be selected depending on actual requirements such as a chain alkynyl group. The chain alkynyl group may include linear alkynyl and branched alkynyl groups. In particular, the number of triple bond may be one, two, three or four.

Examples of the alkynyl group may be given, such as,

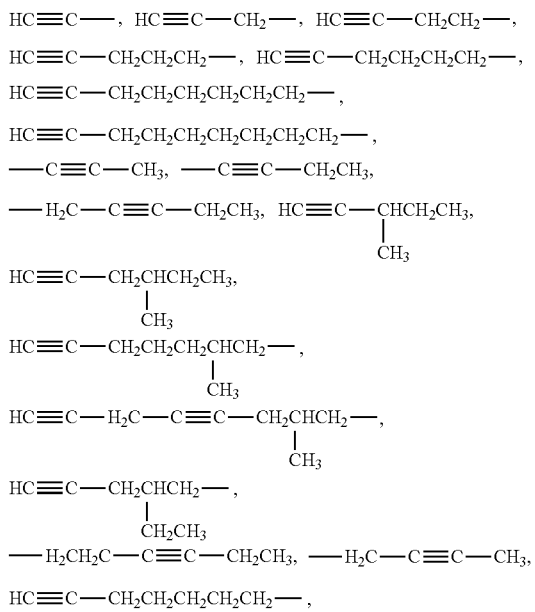

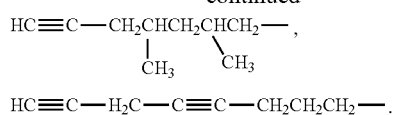

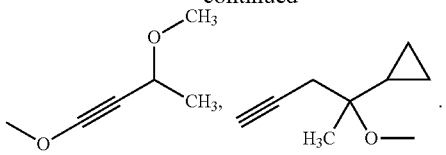

In the above general formula I, the position and number of oxygen atoms added in an alkynyl group having 2 to 20 carbon atoms are not particularly limited and may be selected according to actual demands. The number of oxygen atoms may be one, two, three or four.

Examples of the alkynyloxy group may be given, such as,

HC≡C—CH$_2$CH$_2$O—, HC≡C—CH$_2$CH$_2$CH$_2$O—,

HC≡C—CH$_2$O—, H$_3$CH$_2$C—C≡C—CH$_2$CH$_2$O—,

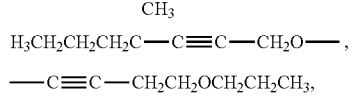

H$_3$CH$_2$CH$_2$CH$_2$C—C≡C—CH$_2$O—,

—C≡C—CH$_2$CH$_2$OCH$_2$CH$_2$CH$_3$,

H$_3$CH$_2$C—C≡C—CH$_2$CH$_2$O—,

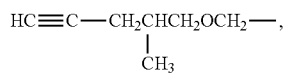

HC≡C—CH$_2$CH$_2$CH$_2$CH$_2$O—,

HC≡C—CH$_2$CH$_2$CH$_2$CH$_2$CH$_2$CH$_2$O—,

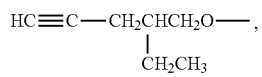

HC≡C—H$_2$C—C≡C—CH$_2$CH$_2$OCH$_2$—,

HC≡C—CH$_2$CH$_2$CH$_2$CH$_2$CH$_2$CH$_2$CH$_2$O—,

HC≡C—CH$_2$CH$_2$CH$_2$CH$_2$CH$_2$O—,

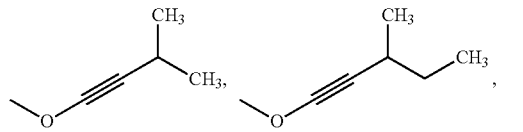

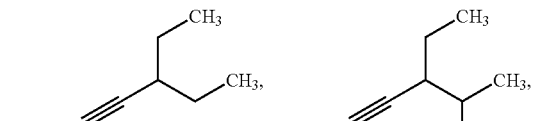

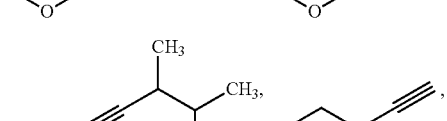

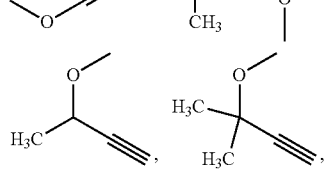

In the general formula I, the number of the halogen atom and the substitution position thereof in the haloalkynyl group having 2 to 20 carbon atoms with a halogen atom of F, Cl, Br, and I are not particularly limited. According to actual demand, the halogen atom may be selected to replace some of the hydrogen atoms or all of the hydrogen atoms in the alkynyl group. For example, the number of halogen atoms may be one, two, three, or four. When the number of halogen atoms is two or more, the halogen atoms may be the same or different.

Examples of the haloalkynyl group may be given, such as,

I—C≡C—, I—C≡C—CH$_2$—,

Br—C≡C—CH$_2$CH$_2$—, I—C≡C—CH$_2$CH$_2$CH$_2$—,

I—C≡C—CH$_2$CH$_2$CH$_2$CH$_2$CH$_2$CH$_2$—,

I—C≡C—CH$_2$CH$_2$CH$_2$CH$_2$CH$_2$CH$_2$CH$_2$—,

—HC—C≡C—CH$_3$,
  |
  I

F—C≡C—CH$_2$CH$_2$CH$_2$CH$_2$—,

I—C≡C—CH$_2$CH$_2$CH$_2$CH$_2$—,

—C≡C—CH$_2$Br, —C≡C—CHCH$_3$.
                            |
                            Br

In the above-mentioned general formula I, the kind and number of alkynyloxy groups to which a halogen atom is attached in the haloalkynyloxy group having 2 to 20 carbon atoms are not particularly limited and may be selected depending on actual requirements such linear alkynyl and branched alkynyl groups. The number of oxygen atom in the alkynyloxy group is preferably one or two. In addition, the number of the halogen atom to which alkynyloxy group is attached may be one, two, three or four.

The examples of the haloalkynyloxy group may be given, such as,

I—C≡C—CH$_2$CH$_2$O—,

I—C≡C—CH$_2$CH$_2$CH$_2$O—,

F$_3$CH$_2$C—C≡C—CH$_2$CH$_2$O—,

I—C≡C—CH$_2$CHCH$_2$O—
              |
              CH$_3$        ,

H$_3$CHCH$_2$CH$_2$C—C≡C—CH$_2$O—
   |
   Br                                ,

—C≡C—CH$_2$CH$_2$OCH$_2$CH$_2$CH$_2$
                                          \
                                           Br,

I—C≡C—H$_2$C—C≡C—CH$_2$CH$_2$OCH$_2$—,

—C≡C—CH$_2$CHCH$_2$O—
              |
              CHBrCH$_3$  ,   Br—C≡C—CH$_2$O—.

In the above general formula I, the position and number of oxygen atoms added in an alkenyloxy group having 2 to 20 carbon atoms are not particularly limited and may be selected according to actual demands. The number of oxygen atoms may be one, two, three or four.

Examples of the alkenyloxy group may be given, such as,

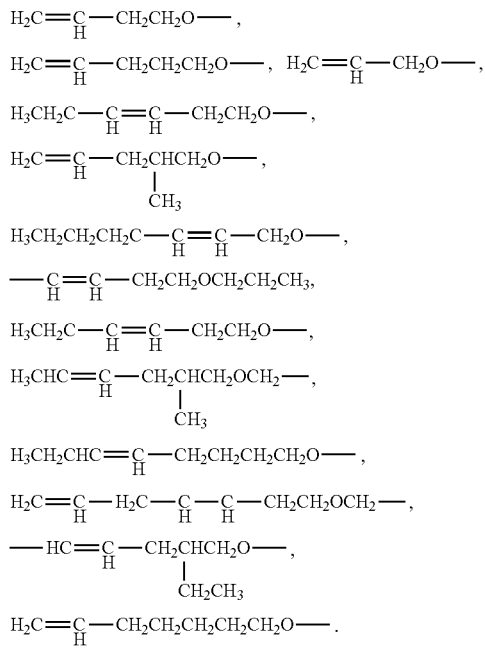

In the general formula I, the number of halogen atoms in the haloalkenyloxy group having 2 to 20 carbon atoms with a halogen atom of F, Cl, Br, and I may be one, two, three, or four. When the number of halogen atoms is two or more, the halogen atoms may be the same or different.

Examples of the haloalkenyloxy group may be given, such as,

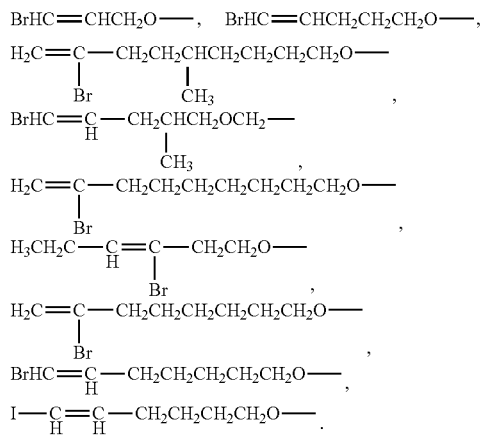

As an improvement of the Lithium ion battery electrolyte of the present invention, the lithium fluoro oxalate borate is selected from one or more of the compounds represented by the general formulas D1 to D22:

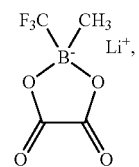
D1

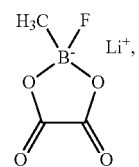
D2

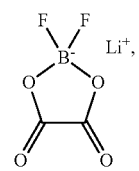
D3

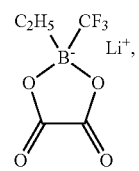
D4

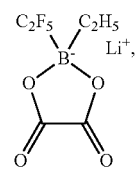
D5

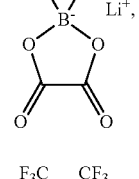
D6

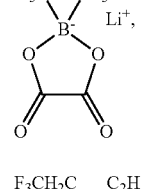
D7

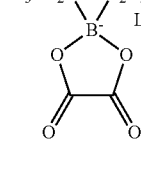
D8

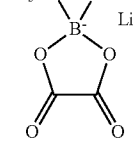
D9

-continued

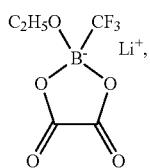 D10

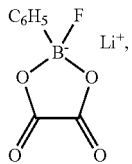 D11

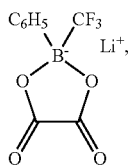 D12

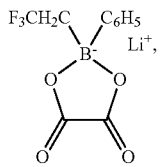 D13

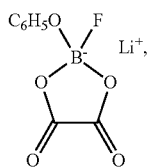 D14

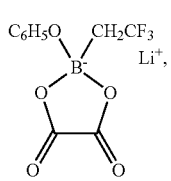 D15

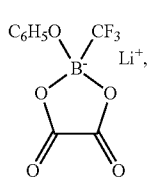 D16

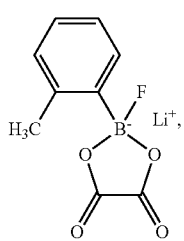 D17

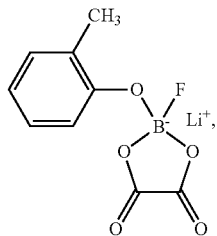 D18

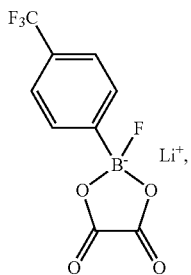 D19

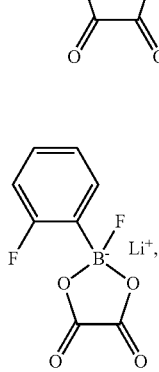 D20

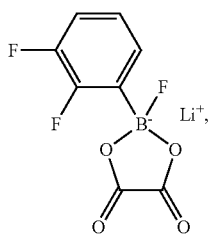 D21

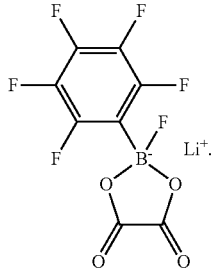 D22

As an improvement of the Lithium ion battery electrolyte of the present invention, the lithium fluoro oxalate borate is present in an amount of 0.1 to 8%, preferably 0.1% to 3%, based on the total weight of the electrolyte.

As an improvement of the electrolyte solution of the Lithium ion battery of the present invention, the cyclic fluoro carbonate has the general formula:

Formula II

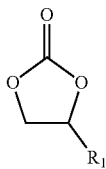

wherein $R_1$ is selected from a halogen atom or a halo alkyl group having 1 to 20 carbon atoms.

As an improvement of the Lithium ion battery electrolyte of the present invention, the cyclic fluoro carbonate is selected from one or more of the compounds represented by the general formulas A1 to A7:

A1

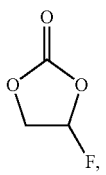

A2

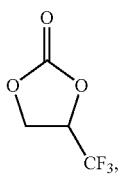

A3

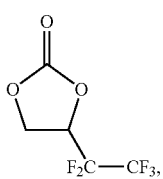

A4

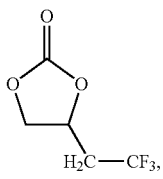

A5

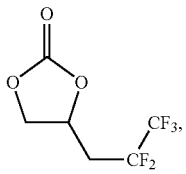

A6

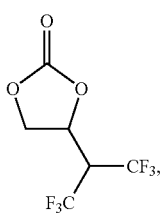

A7

As an improvement of the Lithium ion battery electrolyte of the present invention, the cyclic fluoro carbonate is present in an amount of 0.5 to 45%, preferably 15 to 25% based on the total weight of the electrolyte.

As an improvement of the electrolyte solution of the Lithium ion battery of the present invention, the cyclic phosphazene has the structural formula:

Formula III wherein the substituents $R_2$, $R_3$, $R_4$, $R_5$, $R_6$ and $R_7$ are each independently selected from one of H, a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, a haloalkyl group having 1 to 20 carbon atoms, a haloalkenyl group having 2 to 20 carbon atoms, a halo alkynyl group having 2 to 20 carbon atoms, a halo aryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, a haloalkoxy group having 1 to 20 carbon atoms, a haloalkenyloxy group having 2 to 20 carbon atoms, a haloalkynyloxy group having 2 to 20 carbon atoms, and a haloaryloxy group having 6 to 20 carbon atoms, and at least two of $R_3$, $R_5$ and $R_7$ are selected from a halogen atom, preferably a fluorine atom.

As an improvement of the Lithium ion battery electrolyte of the present invention, in the general structural formula III of the cyclic phosphazene, at least one of $R_2$, $R_4$ and $R_6$ is selected from one of a halogen atom, an alkyloxy group having 1 to 20 carbon atoms, an alkenyloxy group having 2 to 20 carbon atoms, an alkynyloxy group having 2 to 20 carbon atoms, an aryloxy group having 6 to 20 carbon atoms, a haloalkoxy group having 1 to 20 carbon atoms, a haloalkenyloxy group having 2 to 20 carbon atoms, a haloalkynyloxy group having 2 to 20 carbon atoms, and a haloaryloxy group having 6 to 20 carbon atoms.

As an improvement of the Lithium ion battery electrolyte of the present invention, in the general structural formula III of the cyclic phosphazene, $R_2$, $R_3$, $R_4$, $R_5$, $R_6$ and $R_7$ are each independently selected from one of H, a halogen atom, an alkyl group having 1 to 10 carbon atoms, an alkenyl group having 2 to 10 carbon atoms, an alkynyl group having 2 to 10 carbon atoms, an aryl group having 6 to 10 carbon atoms, a haloalkyl group having 1 to 10 carbon atoms, a haloalkenyl group having 2 to 10 carbon atoms, a haloalkynyl group having 2 to 10 carbon atoms, a haloaryl group having 6 to 10 carbon atoms, an alkoxy group having 1 to 10 carbon atoms, an alkenyloxy group having 2 to 10 carbon atoms, an alkynyloxy group having 2 to 10 carbon atoms, an aryloxy group having 6 to 10 carbon atoms, a haloalkoxy group having 1 to 10 carbon atoms, a haloalkenyloxy group having 2 to 10 carbon atoms, a haloalkynyloxy group having 2 to 10 carbon atoms, and a haloaryloxy group having 6 to 10 carbon atoms, and at least two of $R_3$, $R_5$ and $R_7$ are selected from a halogen atom, and at least one of $R_2$, $R_4$ and $R_6$ is selected from a halogen atom, an alkoxy group having 1 to 10 carbon atoms, an alkenyloxy group having 2 to 10 carbon atoms, an alkynyloxy group having 2 to 10 carbon atoms, an aryloxy group having 6 to 10 carbon atoms, a haloalkoxy group having 1 to 10 carbon atoms, a haloalkenyloxy group having 2 to 10 carbon atoms, a haloalkynyloxy group having 2 to 10 carbon atoms, and a haloaryloxy group having 6 to 10 carbon atoms.

As an improvement of the Lithium ion battery electrolyte of the present invention, the cyclic phosphazene is selected from one or more of the compounds represented by the general formulas B1 to B17:

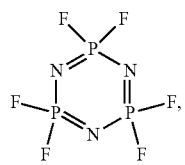

B1

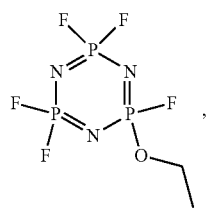

B2

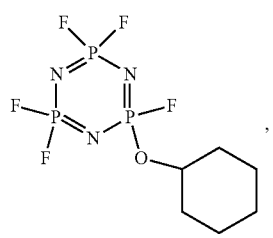

B3

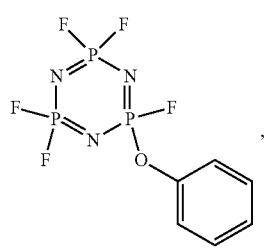

B4

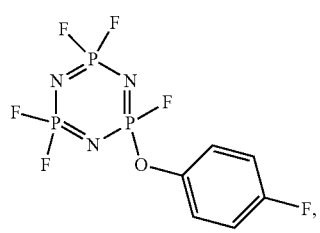

B5

-continued

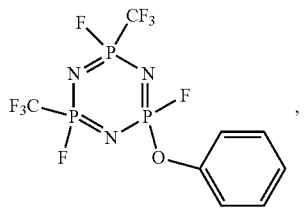

B6

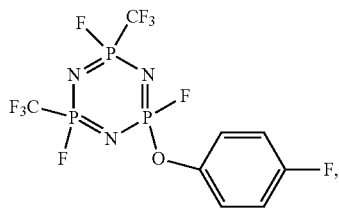

B7

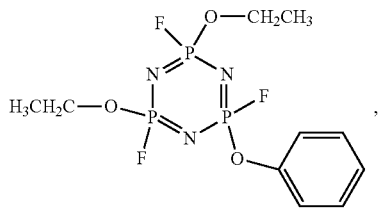

B8

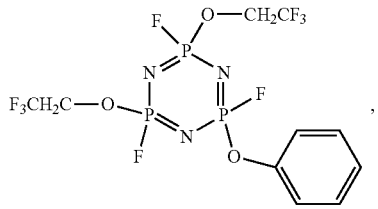

B9

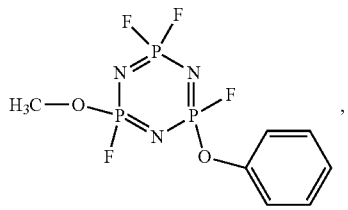

B10

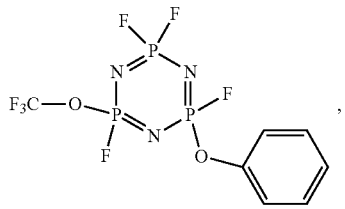

B11

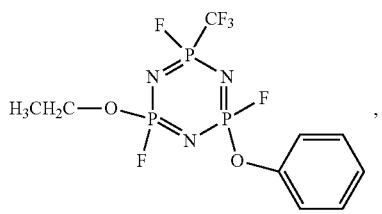

B12

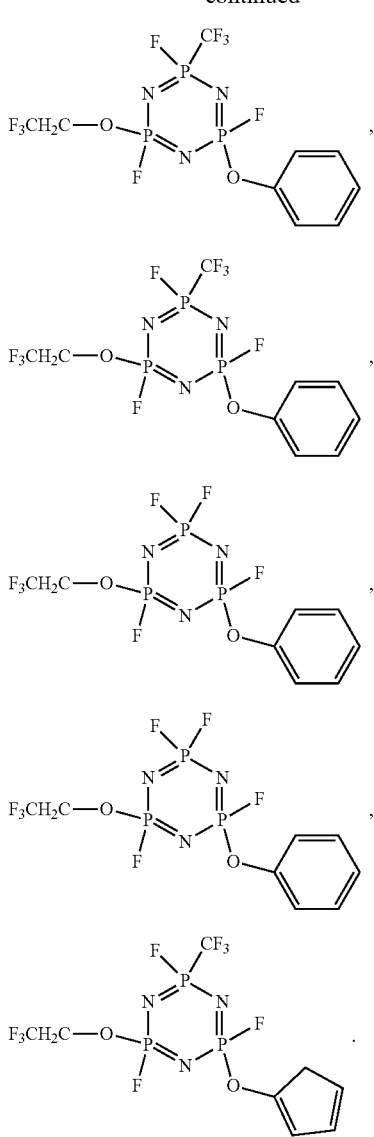

B13, B14, B15, B16, B17

As an improvement of the Lithium ion battery electrolyte of the present invention, the cyclic phosphazene is present in an amount of 0.1 to 12%, preferably 1 to 5%, based on the total weight of the electrolyte.

As an improvement of the electrolyte solution of the Lithium ion battery of the present invention, the cyclic sulfate has the general formula:

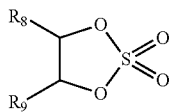

Formula IV wherein $R_8$ and $R_9$ are each independently selected from one of H, a halogen atom, an alkyl group having 1 to 20 carbon atoms, an alkenyl group having 2 to 20 carbon atoms, an alkynyl group having 2 to 20 carbon atoms, an aryl group having 6 to 20 carbon atoms, a haloalkyl group having 1 to 20 carbon atoms, a haloalkenyl group having 2 to 20 carbon atoms, a haloalkynyl group having 2 to 20 carbon atoms, a haloaryl group having 6 to 20 carbon atoms, an alkoxy group having 1 to 20 carbon atoms, an alkenyloxy group having 2 to 20 carbon atoms, an alkynyloxy group having 2 to 20 carbon atoms, an aryloxy group having 6 to 20 carbon atoms, a haloalkoxy group having 1 to 20 carbon atoms, a haloalkenyloxy group having 2 to 20 carbon atoms, a haloalkynyloxy group having 2 to 20 carbon atoms, and a haloaryloxy group having 6 to 20 carbon atoms.

As an improvement of the Lithium ion battery electrolyte of the present invention, the cyclic sulfate is selected from one or more of the compounds represented by the formulas C1 to C8:

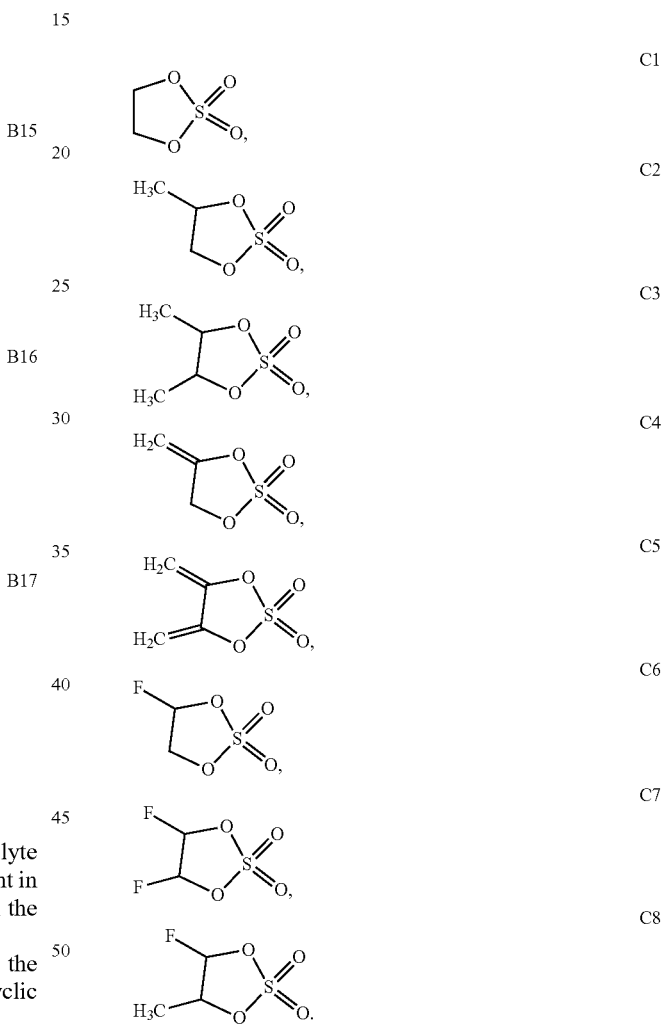

C1, C2, C3, C4, C5, C6, C7, C8

As an improvement of the Lithium ion battery electrolyte of the present invention, the cyclic sulfate is present in an amount of 0.1 to 8%, preferably 1% to 3%, based on the total weight of the electrolyte.

As an improvement of the Lithium ion battery electrolyte of the present invention, the lithium salt is selected from one or more of LiPF$_6$, LiBF$_4$, LiN(SO$_2$F)$_2$ (abbreviated as LiFSI), LiClO$_4$, LiAsF$_6$, LiB(C$_2$O$_4$)$_2$ (abbreviated as LiBOB), LiBF$_2$(C$_2$O$_4$) (abbreviated as LiDFOB), LiN(SO$_2$R$_F$)$_2$, LiN(SO$_2$F)(SO$_2$R$_F$); preferably the lithium salt is selected from one or more of LiPF$_6$, LiN(SO$_2$F)$_2$, LiN(CF$_3$SO$_2$)$_2$, LiB(C$_2$O$_4$)$_2$, LiBF$_2$(C$_2$O$_4$); further preferably, the lithium salt is selected from one or more of LiPF$_6$, LiN(SO$_2$F)$_2$, LiBF$_2$(C$_2$O$_4$); wherein R$_F$ is represented by C$_n$F$_{2n+1}$, n is an integer from 1 to 10, preferably R$_F$ is —CF$_3$, —C$_2$F$_5$ or —CF$_2$CF$_2$CF$_3$.

As an improvement of the Lithium ion battery electrolyte of the present invention, the lithium salt is present in an amount of 6.25% to 25%, preferably 6.25% to 18.8%, based on the total weight of the electrolyte.

As an improvement of the Lithium ion battery electrolyte of the present invention, the organic solvent is a non-aqueous organic solvent including carbonates (e.g., cyclic carbonates or chain carbonates), carboxylates (e.g., cyclic carboxylates or chain carboxylates), halo carbonates and the like. In particular, the organic solvent is selected from one or more of ethylene carbonate, propylene carbonate, butylene carbonate, pentene carbonate, dimethyl carbonate, diethyl carbonate, dipropyl carbonate, methyl ethyl carbonate, 1,4-butyrolactone, methyl propionate, methyl butyrate, ethyl acetate, ethyl propionate, propyl propionate, and ethyl butyrate.

As an improvement of the Lithium ion battery electrolyte of the present invention, the additive further includes lithium difluorophosphate (LiPO$_2$F$_2$) and lithium bisfluorosulfonylimide (LiFSI).

As an improvement of the Lithium ion battery electrolyte of the present invention, the lithium difluorophosphate is present in an amount of 0.1 to 5% based on the total weight of the electrolyte.

As an improvement of the Lithium ion battery electrolyte of the present invention, the lithium bisfluorosulfonyl imide is present in an amount of 0.1 to 5% based on the total weight of the electrolyte.

Lithium difluorophosphate (LiPO$_2$F$_2$) will significantly reduce the low temperature DCR value of the battery and improve rate capability. Lithium bisfluorosulfonyl imide (LiFSI) can improve the storage capacity retention at 60° C. when its addition is less, but when too much is added, it will corrode the aluminum foil and deteriorate the electrical properties of the batteries. Therefore, when one or both of lithium difluorophosphate and lithium difluorosulfonyl imide are further added to the electrolyte, they may further improve the rate capability of the Lithium ion battery, suppress the high temperature gas production and improve its cycle life, high temperature storage performance and safety performance.

In order to achieve the above object, the present invention also provides a Lithium ion battery comprising a positive electrode, a negative electrode, a separator interposed between the positive electrode and the negative electrode, and an electrolyte, wherein the electrolyte is the electrolyte as described in any one of the above paragraphs.

As an improvement of the Lithium ion battery of the present invention, the positive electrode comprises a positive electrode current collector and a positive electrode film on the positive electrode current collector, wherein the positive electrode film comprises a positive electrode active material, a conductive agent and a binder, and wherein the positive electrode active material is selected from at least one of lithium cobaltate, a ternary material, a phosphate salt material and lithium manganate.

As an improvement of the Lithium ion battery of the present invention, the negative electrode comprises a negative electrode current collector and a negative electrode film on the negative electrode current collector, wherein the negative electrode film comprises a negative electrode active material, a conductive agent and a binder. The negative electrode active material is selected from one or more of metal lithium, natural graphite, man-made graphite, meso-carbon microbead (hereinafter referred to as MCMB), hard carbon, soft carbon, silicon, silicon-carbon composite, Li—Sn alloy, Li—Sn—O alloy, Sn, SnO, SnO$_2$, lithiumated TiO$_2$—Li$_4$Ti$_5$O$_{12}$ with spinel structure, and Li—Al alloy.

As an improvement of the Lithium ion battery of the present invention, the negative electrode comprises a silicon-carbon composite.

Compared with the prior art, the Lithium ion battery of the present invention and the electrolyte thereof have at least the following technical effects:

By adding a cyclic fluoro carbonate, a cyclic phosphazene, a cyclic sulfate and a lithium fluoro oxalate borate to the electrolyte of the present invention, the four additives can act at the electrode interface of the Lithium ion battery synergistically and form a stable CEI film and SEI film on the positive and negative electrodes so as to protect the positive and negative interface, while improving the acidic atmosphere of the lithium-ion battery electrolyte, reducing the damage effect of HF on the positive and negative interface, and significantly reducing the low temperature resistance of the lithium-ion battery Internal resistance, thereby improving the lithium-ion battery cycle life, high temperature storage performance, safety performance and rate capability.

DETAILED DESCRIPTION

The present invention will be described in further detail with reference to the following examples, but it is to be understood that the embodiments of the invention are merely for the purpose of explaining the invention and are not intended to limit the scope of the invention. Moreover the embodiments of the present invention are not limited to the examples given in the description.

The reagents, materials and apparatus used in the examples and comparative examples are commercially available unless other indicated, and the reagents used may also be prepared by conventional methods.

Example 1

(1) Preparation of Positive Electrode

A positive electrode active material, polyvinylidene fluoride as a binder and acetylene black as a conductive agent were mixed in a mass ratio of 98:1:1, followed by N-methylpyrrolidone as a solvent and then the mixture was stirred and dispersed under a vacuum stirrer to obtain a positive electrode slurry. The positive electrode slurry was uniformly applied on an aluminum foil, and the coated aluminum foil was dried at room temperature and then transferred to an oven at 120° C. for 1 hour. Then, the positive electrode was obtained by cold pressing and cutting.

(2) Preparation of Negative Electrode

A negative electrode active material SiC composite, acetylene black as a conductive agent, sodium carboxymethyl cellulose (CMC) solution as a thickening agent and styrene-butadiene rubber emulsion as a binder were mixed in a mass ratio of 96:2:1:1, followed by deionized water, and then the mixture was stirred and dispersed under a vacuum stirrer to obtain a negative electrode slurry. The negative electrode slurry was uniformly applied on a copper foil, and the coated copper foil was dried at room temperature and then transferred to an oven at 120° C. for 1 hour. Then, the negative electrode was obtained by cold pressing and cutting.

(3) Preparation of Electrolyte

Ethylene carbonate (EC), methyl ethyl carbonate (EMC) and diethyl carbonate (DEC) were mixed at a mass ratio EC:EMC:DEC of 1:1:1 to obtain an organic solvent. Then, the lithium salt $LiPF_6$ was dissolved in the mixed organic solvent, followed by mixing it with the additives A, B, C and D uniformly to obtain an electrolyte. The kinds and amounts of the respective additives in the electrolyte were shown in Table 1. $LiPF_6$ is present in an amount of 1 2.5% based on the total weight of the electrolyte.

(4) Preparation of Lithium Ion Battery

The positive electrode, the negative electrode, and a separator were wound into a battery core, and then the battery core was charged into a packaging shell, the electrolyte was injected and sealed. The Lithium ion battery was obtained by the steps of standing, pressing, forming, degassing and testing capacity.

The Experiments of Examples 2-15 and Comparative Examples 1-9 were substantially the same as those of Example 1. The battery system, components' kind and amounts of the batteries and the test results of the examples and the comparative examples are shown in Table 1-2.

Performance Test of Lithium Ion Battery (1) Test of DC Discharge Resistance at Low Temperature of Lithium Ion Battery At 25° C., the Lithium ion battery was allowed to stand for 30 minutes, then charged at a constant current of 1 C to 4.2V, and then charged at a constant voltage of 4.2V to a current of ≤0.05 C, and allowed to stand for 5 minutes, and then discharged at a constant current of 1 C to 2.8V. The resulting discharge capacity is identified as the Lithium-ion battery rated capacity, 100% SOC.

And then the Lithium-ion battery was charged at 1 C current for 30 min to adjust the Lithium-ion battery charge state of 50% SOC, and then the Lithium-ion battery was transferred to a low temperature environment of −20° C. and allowed to stand more than 2 h, so that the internal and external temperature of Lithium-ion battery keep to be consistent. Finally the Lithium-ion battery was discharged at a constant current of 0.3 C for 10 s, and the voltage before and after the discharge were recorded. DC discharge resistance (DCR) was calculated as follows:

$$DCR=(U0-U1)/I$$

where U0 denotes the voltage before discharge and U1 denotes the voltage after discharge.

(2) Cycle Test of Lithium-Ion Battery at 25° C. and 45° C.

At 25° C. and 45° C., the Lithium ion battery was charged to 4.2V at a constant current of 1 C, and then charged to a current of 0.05 C at a constant voltage of 4.2V, and then discharged at a constant current of 1 C to 2.8V, which was identified as a first cycle. The resulting discharge capacity is identified as a first discharge capacity. Following above conditions the Lithium ion battery was subjected to several cycle until the discharge capacity of the Lithium ion battery after cycle test was less than or equal to 80% of the first discharge capacity. The number of cycle test was record.

(3) Test of High-Temperature Storage Capacity of Lithium-Ion Battery Test

At 25° C., the Lithium ion battery was allowed to stand for 30 minutes, then charged at a constant current of 1 C to 4.2V, and then charged at a constant voltage of 4.2V to a current of ≤0.05 C, and allowed to stand for 5 minutes, and then discharged at a constant current of 1 C to 2.5V. The resulting discharge capacity was identified as the capacity of the Lithium-ion battery before high temperature storage.

At 25° C., the Lithium ion battery was allowed to stand for 30 min and then charged to 4.2 V at a constant current of 1 C and then charged at a constant voltage of 4.2 V to a current of ≤0.05 C and allowed to stand for 5 min. Then, the Lithium ion battery was stored at 60° C. for 30 days. After that, the battery was discharged at a constant current of 1 C to 2.5V. The resulting discharge capacity was identified as the capacity of the Lithium-ion battery after high temperature storage.

The Lithium ion battery's reversible capacity retention after 30 days storage at 60° C. (%)=(capacity after high temperature storage/capacity before high temperature storage)×100%.

(4) Gas Production Test of Lithium-Ion Battery at High Temperature Storage

At 25° C., the Lithium ion battery was allowed to stand for 30 minutes, then charged at a constant current of 1 C to 4.2V, and then charged at a constant voltage of 4.2V to a current of 0.05 C, so that it was in a fully charged state of 4.2V. The resulting battery was placed in a high-temperature oven at 70° C. for 10 days, and the volume expansion rate of the Lithium ion battery stored at 70° C. for 10 days was recorded.

Volume expansion rate of the Lithium ion battery after storage at 70° C. for 10 days (%)=(volume after storage−volume before storage)/volume before storage×100%.

TABLE 1

Cell systems, related components and amount of Examples 1 to 15 and Comparative Examples 1 to 9

| | | Additive | | | | | | | | $LiPO_2F_2$ | LIFSI |
|---|---|---|---|---|---|---|---|---|---|---|---|
| | | Additive A | | Additive B | | Additive C | | Additive D | | | |
| Item | System | Kind | Content/% | Kind | Content/% | Kind | Content/% | Kind | Content/% | Content/% | Content/% |
| CEx1 | $LiNi_{0.3}Co_{0.3}Mn_{0.3}O_2$/SiC | / | / | / | / | / | / | / | / | / | / |
| CEx2 | $LiNi_{0.3}Co_{0.3}Mn_{0.3}O_2$/SiC | A1 | 15.0 | / | / | / | / | / | / | / | / |
| CEx3 | $LiNi_{0.3}Co_{0.3}Mn_{0.3}O_2$/SiC | / | / | B1 | 3.0 | / | / | / | / | / | / |
| CEx4 | $LiNi_{0.3}Co_{0.3}Mn_{0.3}O_2$/SiC | / | / | / | / | C1 | 1.0 | / | / | / | / |
| CEx5 | $LiNi_{0.3}Co_{0.3}Mn_{0.3}O_2$/SiC | / | / | / | / | / | / | D1 | 0.3 | / | / |
| CEx6 | $LiNi_{0.3}Co_{0.3}Mn_{0.3}O_2$/SiC | A1 | 15.0 | B1 | 3.0 | C1 | 1.0 | / | / | / | / |
| CEx7 | $LiNi_{0.3}Co_{0.3}Mn_{0.3}O_2$/SiC | A1 | 15.0 | B1 | 3.0 | / | / | D2 | 0.3 | / | / |
| CEx8 | $LiNi_{0.3}Co_{0.3}Mn_{0.3}O_2$/SiC | A1 | 15.0 | / | / | C2 | 1.0 | D3 | 0.3 | / | / |
| CEx9 | $LiNi_{0.3}Co_{0.3}Mn_{0.3}O_2$/SiC | / | / | B1 | 3.0 | C3 | 1.0 | D4 | 0.3 | / | / |
| Ex1 | $LiNi_{0.3}Co_{0.3}Mn_{0.3}O_2$/SiC | A1 | 5.0 | B1 | 1.0 | C5 | 0.1 | D1 | 0.1 | / | / |
| Ex3 | $LiNi_{0.3}Co_{0.3}Mn_{0.3}O_2$/SiC | A2 | 10.0 | B2 | 2.0 | C4 | 0.5 | D2 | 0.3 | / | / |
| Ex3 | $LiNi_{0.3}Co_{0.3}Mn_{0.3}O_2$/SiC | A1 | 15.0 | B2 | 3.0 | C1 | 1.0 | D3 | 0.3 | / | / |

TABLE 1-continued

Cell systems, related components and amount of Examples 1 to 15 and Comparative Examples 1 to 9

| Item | System | Additive A Kind | Additive A Content/% | Additive B Kind | Additive B Content/% | Additive C Kind | Additive C Content/% | Additive D Kind | Additive D Content/% | $LiPO_2F_2$ Content/% | LIFSI Content/% |
|---|---|---|---|---|---|---|---|---|---|---|---|
| Ex4 | $LiNi_{0.3}Co_{0.3}Mn_{0.3}O_2$/SiC | A1 | 20.0 | B3 | 5.0 | C6 | 2.0 | D4 | 1.0 | / | / |
| Ex5 | $LiNi_{0.3}Co_{0.3}Mn_{0.3}O_2$/SiC | A3 | 25.0 | B2 | 3.0 | C2 | 2.0 | D5 | 0.5 | / | / |
| Ex6 | $LiNi_{0.3}Co_{0.3}Mn_{0.3}O_2$/SiC | A1 | 30.0 | B4 | 8.0 | C1 | 2.0 | D6 | 3.0 | / | / |
| Ex7 | $LiNi_{0.3}Co_{0.3}Mn_{0.3}O_2$/SiC | A4 | 45.0 | B2 | 0.1 | C8 | 0.1 | D1 | 5.0 | / | / |
| Ex8 | $LiNi_{0.8}Co_{0.1}Mn_{0.1}O_2$/SiC | A5 | 1.0 | B2 | 12.0 | C2 | 5.0 | D3 | 0.3 | / | / |
| Ex9 | $Li(Ni_{0.8}Co_{0.1}Mn_{0.1})_{0.99}Al_{0.01}O_2$/SiC | A1 | 15.0 | B5 | 1.0 | C2 | 1.0 | D4 | 8.0 | / | / |
| Ex10 | $LiMn_2O_4$/SiC | A1 | 25.0 | B2 | 3.0 | C2 | 1.0 | D5 | 0.3 | 1.5 | / |
| Ex11 | $LiNi_{0.5}Mn_{1.5}O_4$/SiC | A1 | 15.0 | B2 | 1.0 | C7 | 1.0 | D6 | 0.3 | 0.1 | / |
| Ex12 | $LiCoO_2$/SiC | A1 | 0.5 | B1 | 3.0 | C1 | 8.0 | D1 | 0.5 | 5.0 | / |
| Ex13 | $LiNi_{0.8}Co_{0.15}Al_{0.05}O_2$/SiC | A1 | 20.0 | B1 | 3.0 | C2 | 1.0 | D2 | 0.3 | / | 0.1 |
| Ex14 | $LiNi_{0.8}Co_{0.15}Al_{0.05}O_2$/SiC | A2 | 15.0 | B2 | 3.0 | C3 | 1.0 | D6 | 0.3 | / | 2.0 |
| Ex15 | $LiNi_{0.8}Co_{0.15}Al_{0.05}O_2$/SiC | A3 | 25.0 | B3 | 3.0 | C3 | 1.0 | D1 | 0.1 | / | 5.0 |

TABLE 2

Performance results of Examples 1 to 15 and Comparative Examples 1 to 7

| Item | DCR/ mohm | 25° C. cycle number | 45° C. cycle number | reversible capacity retention@ 60° C. for 30 d | Volume expansion rate@70° C. for 10 d |
|---|---|---|---|---|---|
| CEx1 | 416 | 190 | 292 | 68% | 40% |
| CEx2 | 476 | 843 | 408 | 78% | 44% |
| CEx3 | 420 | 349 | 319 | 81% | 27% |
| CEx4 | 418 | 235 | 316 | 85% | 18% |
| CEx5 | 425 | 236 | 260 | 79% | 36% |
| CEx6 | 477 | 998 | 816 | 87% | 24% |
| CEx7 | 455 | 993 | 470 | 71% | 37% |
| CEx8 | 456 | 845 | 619 | 82% | 24% |
| CEx9 | 407 | 379 | 734 | 88% | 15% |
| Ex1 | 380 | 603 | 862 | 86% | 25% |
| Ex2 | 374 | 796 | 781 | 83% | 27% |
| Ex3 | 388 | 1008 | 827 | 89% | 18% |
| Ex4 | 359 | 958 | 798 | 87% | 20% |
| Ex5 | 371 | 1198 | 770 | 86% | 21% |
| Ex6 | 409 | 698 | 506 | 80% | 35% |
| Ex7 | 425 | 647 | 397 | 55% | 43% |
| Ex8 | 381 | 381 | 479 | 91% | 6% |
| Ex9 | 457 | 669 | 493 | 74% | 20% |
| Ex10 | 369 | 489 | 530 | 94% | 14% |
| Ex11 | 358 | 669 | 678 | 93% | 7% |
| Ex12 | 303 | 361 | 571 | 85% | 10% |
| Ex13 | 376 | 878 | 751 | 83% | 26% |
| Ex14 | 367 | 909 | 794 | 91% | 23% |
| Ex15 | 369 | 361 | 191 | 61% | 35% |

Results and Analysis

Comparison of Comparative Example 1 with Comparative Examples 2-5

As can be seen, when one of additive (A) cyclic fluoro carbonate (A), additive (B) cyclic phosphazene, additive (C) cyclic sulfate, and additive (D) fluoro oxalic acid Lithium borate was added to the electrolyte of the Lithium ion battery of Comparative Examples 2 to 5, the performance of the Lithium ion battery was not improved.

Comparison of Comparative Example 1 with Comparative Examples 6-9

As can be seen, when any three of additive (A) cyclic fluoro carbonate (A), additive (B) cyclic phosphazene, additive (C) cyclic sulfate, and additive (D) fluoro oxalic acid lithium borate were added to the electrolyte of the Lithium ion battery of Comparative Examples 6 to 9, the performance of the Lithium ion battery was remarkably improved. However, the low temperature resistance DCR was not improved obviously.

Comparison of Comparative Examples 1 to 15 with Comparative Examples 1 to 9

As compared with Comparative Examples 1-9, the additive (A) cyclic fluoro carbonate, the additive (B) cyclic phosphazene, the additive (C) cyclic sulfate, and the additive (D) fluoro oxalic acid lithium borate all were added to the electrolyte of the Lithium ion battery of Examples 1 to 15. The four additives can act at the electrode interface of the Lithium ion battery synergistically and form a stable CEI film and SEI film on the positive and negative electrodes, so as to improve the acidic atmosphere of the lithium-ion battery electrolyte while significantly reducing the low temperature internal resistance of the lithium-ion battery, thereby improving the lithium-ion battery cycle life, high temperature storage performance, safety performance and rate capability.

Among them, the cyclic fluoro carbonate (A) may form a stable and dense SEI film having a good ion transport property on the surface of the negative electrode prior to the organic solvent and suppress the reductive decomposition of the organic solvent, thereby improving the cycle life of the battery at normal temperature. However if its amount is too high, the high temperature cycle and storage performance of the battery will deteriorate. Since cyclic fluoro carbonate (A) decomposes at a high temperature to produce a large amount of acid gas and corrodes the passivation film of the positive and negative electrodes, it when used separately will deteriorate the high temperature performance. The deterioration result becomes more obvious as the amount is increased. Therefore it shall be combined with other acid scavenging agents for use.

The cyclic phosphazene (B) are a good acid scavenging additive. The polyphosphate components produced during the decomposition process of compound (B) can form a SEI film on the surface of the negative electrode so as to improve the cycle life of the battery. The decomposed products can also bond to $H^+$ in the electrolyte, thereby reducing the generation of HF gas and reducing the corrosion of HF to the positive and negative passivation film. Therefore it may improve the acid environment of the Lithium ion battery electrolyte and effectively improve the lithium-ion battery high temperature cycle life. However too high amount will increase DCR and gas generation at high temperature of the lithium-ion battery.

The cyclic sulfate (C) can form a protective film on the surface of the positive and negative electrodes both. The CEI film formed on the positive electrode can protect the positive electrode and reduce the positive gas production, thereby remarkably improving the high temperature cycle and storage performance of the battery.

The fluoro-oxalic acid lithium borate salt (D) can complex with cation in the electrolyte by its $B^-$. It may assist the cyclic fluoro carbonate (A) to participate in the formation of SEI film on the negative electrode. The formed SEI film is dense and elastic thereby improving the cycle life of the battery. Moreover it may assist the cyclic sulfate (C) to participate in the formation of CEI film on the positive electrode, to protect the positive electrode, reduce the positive electrode gas generation and the positive electrode interface impedance and thus improve the high temperature performance and rate capability of the battery. However, when its amount is too high, the battery's DCR will deteriorate due to increased SEI film thickness, thereby affecting cycle life of the battery.

(4) Comparison of Examples 1 to 7

In Examples 1 to 7, as the amount of the fluorocyclic carbonate (A) increased, the cycle life of the battery increased first and then decreased, and the high temperature cycle and the gas production and storage performance deteriorated. The fact is mainly due to the following reasons. When the cyclic fluoro carbonate (A) is insufficient, the concentration required for forming the SEI film cannot be achieved and when its amount is too high, the cyclic fluoro carbonate (A) itself is unstable, side reaction increases, and the gas generation due to its decomposition is serious, thereby deteriorating its battery performance.

(5) Comparison of Examples 1 to 9 with Examples 10 to 12

When $LiPO_2F_2$ was added to the electrolyte of Examples 1 to 9, it can form a CEI film on the positive electrode and thus it is possible to suppress the oxidative decomposition of $LiPF_6$ and the organic solvent on the surface of the positive electrode and suppress the high temperature gas production of the Lithium ion battery, while protecting the positive electrode and helping to improve the low temperature DCR of the Lithium ion battery.

(6) Comparison of Examples 1 to 9 with Examples 13 to 15

When LiFSI was added to the electrolyte of the batteries of Examples 1 to 9, it can remarkably improve gas production performance of the Lithium ion battery at high-temperature storage. LiFSI is more stable than $LiPF_6$ as a lithium salt, which can not only stabilize the lithium salt but also can provide additional Li ions, thereby enhancing the electrical performance of the battery. However when its amount is too high, it will corrode aluminum foil, resulting in deteriorated cycle life, serious gas production, thereby affecting the safety of the battery.

Therefore, it is possible to improve the related properties of the Lithium ion battery by adding an appropriate amount of $LiPO_2F_2$ and/or LiFSI on the basis of Examples 1 to 9.

In view of the above detailed description of the present invention, it can be seen that the Lithium ion battery and the electrolyte of the present invention have at least the following technical effects over the prior art:

By adding a cyclic fluoro carbonate, a cyclic phosphazene, a cyclic sulfate and a lithium fluoro oxalate borate to the electrolyte of the present invention, the four additives can act at the electrode interface of the Lithium ion battery synergistically and form a stable CEI film and SEI film on the positive and negative electrodes so as to protect the positive and negative interface, while improving the acidic atmosphere of the lithium-ion battery electrolyte, reducing the damage effect of HF on the positive and negative interface, and significantly reducing the low temperature internal resistance of the lithium-ion battery, thereby improving the lithium-ion battery cycle life, high temperature storage performance, safety performance and rate capability.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A Lithium ion battery electrolyte comprising an organic solvent, a lithium salt, and an additive, wherein the said additive comprises a cyclic fluoro carbonate (A), a cyclic phosphazene (B), a cyclic sulfate (C) and a lithium fluoro oxalate borate (D), wherein the cyclic fluoro carbonate (A) is

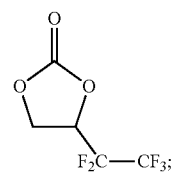

A3 wherein the cyclic phosphazene (B) is

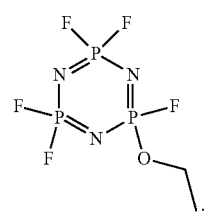

B2 wherein the cyclic sulfate (C) is

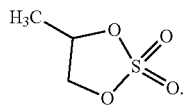

wherein the lithium fluoro oxalato borate (D) is

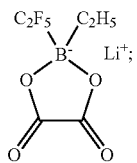

and wherein the cyclic fluoro carbonate is present in an amount of 15 to 25%, based on the total weight of the electrolyte.

2. The Lithium ion battery electrolyte according to claim 1, wherein the lithium fluoro oxalate borate is present in an amount of 0.1 to 8%, based on the total weight of the electrolyte.

3. The Lithium ion battery electrolyte according to claim 1, wherein the cyclic phosphazene is present in an amount of 0.1 to 12%, based on the total weight of the electrolyte.

4. The Lithium ion battery electrolyte according to claim 1, wherein the cyclic sulfate is present in an amount of 0.1 to 8%, based on the total weight of the electrolyte.

5. The Lithium ion battery electrolyte according to claim 1, wherein the additive further comprises at least one of lithium difluorophosphate (LiPO$_2$F$_2$) and lithium bis(fluorosulfonyl)imide (LiFSI).

6. The Lithium ion battery electrolyte according to claim 5, wherein the lithium bis(fluorosulfonyl)imide (LiFSI) is present in an amount of 0.1 to 5% based on the total weight of the electrolyte.

7. A Lithium ion battery comprising: a positive electrode, a negative electrode, a separator between the positive electrode and the negative electrode, and an electrolyte, wherein the electrolyte is the Lithium ion battery electrolyte according to claim 1.

8. The Lithium ion battery according to claim 7, wherein the negative electrode comprises a silicon-carbon composite.

9. The Lithium ion battery electrolyte according to claim 1, wherein the cyclic phosphazene is present in an amount of 1 to 5%, based on the total weight of the electrolyte.

10. The Lithium ion battery electrolyte according to claim 1, wherein the cyclic sulfate is present in an amount of 1 to 3%, based on the total weight of the electrolyte.

11. The Lithium ion battery electrolyte according to claim 5, wherein the lithium difluorophosphate (LiPO$_2$F$_2$) is present in an amount of 0.1 to 5% based on the total weight of the electrolyte.

* * * * *